United States Patent [19]
Hines, Jr. et al.

[11] 3,858,436
[45] Jan. 7, 1975

[54] VEHICLE BRAKE LEAK TESTING SYSTEM AND METHOD

[75] Inventors: Lawrence A. Hines, Jr., St. Clair Shores; Walter M. Gaudette, Jr., Royal Oak, both of Mich.

[73] Assignee: General Motors Corporation, Detroit, Mich.

[22] Filed: Oct. 12, 1973

[21] Appl. No.: 406,116

[52] U.S. Cl. .................................... 73/39, 73/40
[51] Int. Cl. ........................................... G01m 3/02
[58] Field of Search ............. 73/39, 40, 45.1, 45.2, 73/46, 49.4, 132, 168, 4 R; 340/242

[56] References Cited
UNITED STATES PATENTS

| | | | |
|---|---|---|---|
| 3,464,263 | 9/1969 | Omandam, Sr. | 73/132 |
| 3,584,500 | 6/1971 | Diehl | 73/39 |
| 3,662,593 | 5/1972 | Pirrello et al. | 73/132 |

*Primary Examiner*—Charles A. Ruehl
*Attorney, Agent, or Firm*—Charles R. Engle

[57] ABSTRACT

A system for leak testing a closed vehicle brake system by actuating pistons in a master cylinder. A fluid motor in a separate pneumatic plumbing circuit is automatically sequentially actuated extending a plunger engaging the pistons to pressurize the brake fluid in various degress as prescribed in a predetermined test procedure. A solid state electrical control circuit automatically sequences valves in the pneumatic fluid circuit providing desired brake fluid pressures during the leak test. The control circuit includes a digital converter applying a voltage determined by the position of the master cylinder piston at the beginning of a test time period which is continuously used as a reference in opposiion to a position responsive voltage regulated by the linear potentiometer during the test. The control circuit can include a selector switch to operate one of a plurality of separate pneumatic plumbing circuits, each being suited for a particular master cylinder design. In this manner, fluid leakage is accurately and immediately sensed and a fault signal is energized and the test aborted when unacceptable leakage occurs.

5 Claims, 10 Drawing Figures

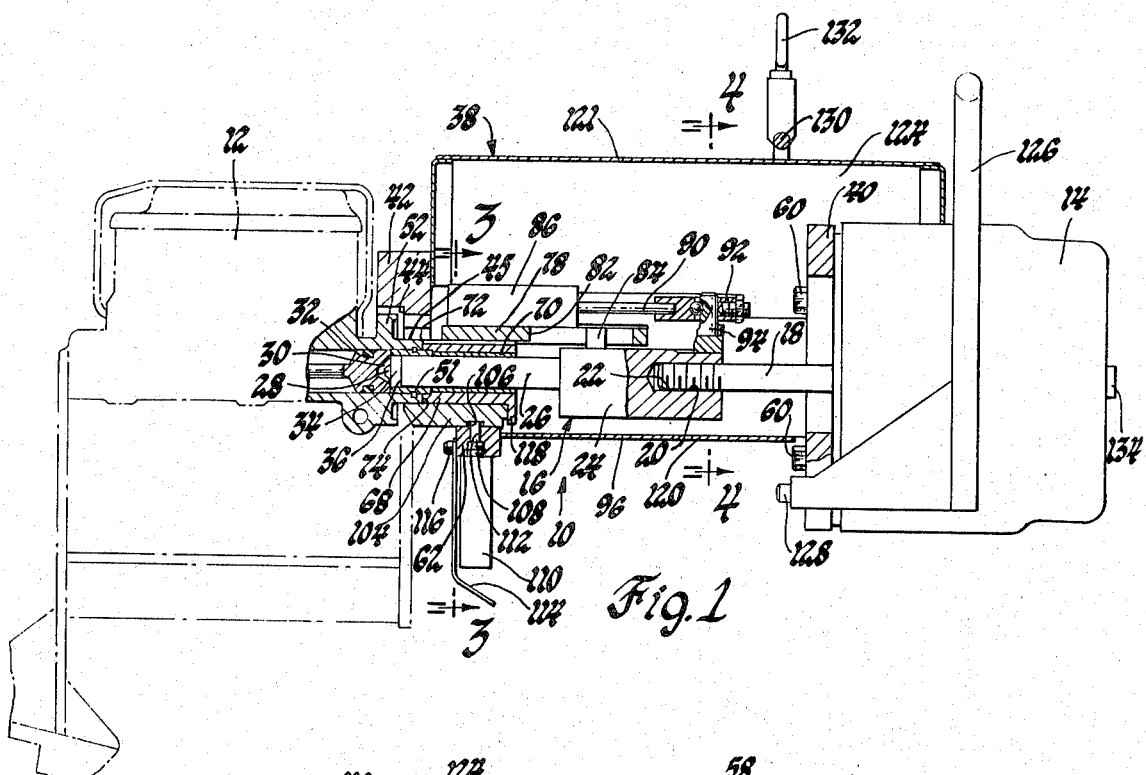

1. ARROWS → CONNECTED TO +5 VOLTS (GND)
2. ARROWS ← CONNECTED TO 0 VOLTS

1. ARROWS → CONNECTED TO +5 VOLTS (GND)
2. ARROWS ← CONNECTED TO 0 VOLTS

1. ARROWS → CONNECTED TO +5 VOLTS (GND)
2. ARROWS ← CONNECTED TO 0 VOLTS

VEHICLE BRAKE LEAK TESTING SYSTEM AND METHOD

BACKGROUND OF THE INVENTION

This invention relates to an automatic electrically controlled vehicle brake leak testing system and more specifically to such a system capable of testing an assembled closed fluid brake system wherein the leak test is regulated by solid state electrical control circuitry, the circuitry capable of being selectively actuated to test two or more distinct vehicle brake systems.

Vehicle brake fluid is highly detrimental to the paint finishes on vehicle bodies and is easily spilled on such finishes if the system is opened for any reason. Therefore, among the purposes of this invention is the provision of a brake leak test system capable of testing a closed vehicle brake system. In this regard, this invention is an improvement over the system shown in U.S. Pat. No. 3,584,500 Diehl, et al., issued June 15, 1971 and assigned to the assignee of this invention.

A further purpose of this invention is to provide a solid state electrical control circuit capable of remembering acceptable leakage ranges and being extremely accurate in measuring the leakage so as to provide reliable test results. Also a purpose of this invention is the capability of the control circuitry to select separate systems so that the acceptable leakage range applies to a particular vehicle brake system. These purposes are accomplished by fitting an adapter on the master cylinder in the brake system, selecting the control circuit for the particular brake system, actuating a fluid motor to initially engage a plunger with the rear piston in the master cylinder, adjusting a linear potentiometer on the adapter to a calibrated position, pressurizing the fluid in the brake system to 300 psi to check for entrapped air as indicated by excessive master cylinder piston movement, pressurizing the fluid to 2,000 psi for expanding the system and testing its ability to withstand this pressure, reducing the fluid pressure to 1,600 psi for a first time period to stabilize the system and for a second leak test time period, storing a reference voltage for the particular system determined by the position of the linear potentiometer at beginning of the leak test time period and applying it to a comparator, applying the voltage determined by the position of the linear potentiometer to the comparator during the test period, and automatically either energizing an accept signal or energizing a fault signal in the case of unacceptable leakage.

SUMMARY OF THE INVENTION

Among the objects of this invention is the provision of a vehicle brake fluid leak detecting system apparatus that can easily and reliably be connected to and test a closed assembled vehicle brake system.

Another object of this invention it the provision of a brake fluid leak detecting system including an adapter easily mounted on and removed from the master cylinder in a vehicle brake system.

A further object of this invention is the provision of a test adapter readily mountable on the master cylinder, the adapter further including a fluid motor selectively operable via control valves in a fluid plumbing circuit engaging a plunger with a master cylinder piston pressurizing the vehicle brake system as prescribed in a predetermined test sequence.

Another object of this invention is the provision of separate pneumatic systems for each type of brake system on the assembly line so that the control circuitry can selectively actuate the appropriate one prior to initiation of the leakage test.

A still further object of this invention is the provision of solid state electrical control circuitry sequencing the fluid control valves providing a predetermined test sequence for the particular vehicle brake system.

Another object of this invention is the provision of means sensing movement of the fluid motor plunger as it actuates or moves with the master cylinder piston.

Another object of this invention is the provision of a lost-motion connection between the sensing means and the fluid motor plunger so that plunger movement is only measured when the plunger moves with a master cylinder piston.

Still another object of this invention is the provision of means in the solid state electrical control circuitry to automatically remember the position of the fluid motor plunger at the beginning of a timed test period and measure any change that occurs during the test obtaining accurate test results so that the brake system is automatically accepted or rejected.

DESCRIPTION OF THE DRAWINGS

FIG. 1 is a side elevational view, partly in section, illustrating the test adapter of this invention positioned upon a flange of a vehicle brake master cylinder assembly.

FIG. 2 is a partial top plan view, partly in section, further illustrating the test adapter positioned upon a flange of the master cylinder assembly.

FIG. 3 is a cross-sectional view of FIG. 1 taken on line 3—3.

FIG. 4 is a cross-sectional view of FIG. 1 taken on line 4—4.

DESCRIPTION OF A PREFERRED EMBODIMENT

Figure 5:
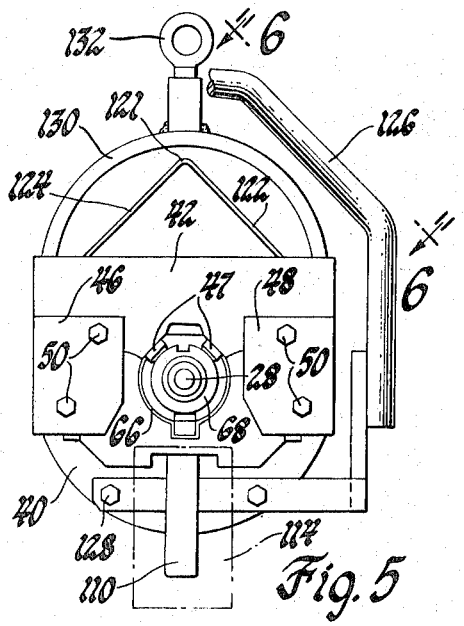
FIG. 5 is an elevational end view of the test adapter removed from the master cylinder flange.

Referring now to FIG. 1, a test adapter 10 of the subject invention is shown placed upon a vehicle brake master cylinder assembly 12 in a test position. The adapter is configured to fit various sizes of master cylinders for a purpose to be later described. The adapter 10 includes a fluid motor 14 containing a diaphragm or piston, not shown, which is operable to extend a plunger assembly 16. More specifically, the plunger assembly 16 includes rod 18 that is connected to the motor diaphragm or piston and is threadably secured at 20 in a threaded bore 22 in an enlarged portion 24 of a brake actuating rod 26. The brake actuating rod 26 terminates in a conical nose piece 28 configured to be received in a like recess 30 in master cylinder piston 32. A cylindrical gauge block 34 having a specific width is fitted and secured between the nose piece 28 and end 36 of rod 26 for a purpose to be later described.

As best illustrated in FIGS. 1 and 2, the fluid motor 14 is secured to a frame assembly 38 including a fluid motor supporting end plate 40 at one end and a master cylinder receiving end plate 42 at an opposite end. End plate 42 contains a stepped cutout area 44 which is partially enclosed by mounting blocks 46 and 48 which in turn are secured to the plate 42 via a plurality of machine screws 50 as best shown in FIG. 5. The blocks 46 and 48 cooperate with plate 42 and its cutout area 44 to define a cavity having specific dimensions providing a desirable tolerance for receiving master cylinder flange 52 when mounting the adapter 10 thereon. End plate 42 may have rest buttons 45 and 47 secured therein for engagement of an annular surface 45 of an axially extending portion 51 of master cylinder flange 52, as best shown in FIG. 5.

With reference to FIG. 2, the end plates 40 and 42 are connected by side rails 54 which have laterally inwardly and outwardly extending reinforcing members 56 and 58 welded thereto. The fluid motor 14 is secured to end plate 40 by a plurality of machine screws 60 as shown in FIG. 1. A plate 62 is welded or otherwise secured to the side rails 54 and extends laterally of the rails near the inside of end plate 42 for slidably supporting the forward end of plunger assembly 16 thereby completing the frame assembly 38.

As best shown in FIG. 3, the plate 62 includes a cylindrical recess 64 containing a cylindrical bushing 66 providing a sliding bearing surface for a sleeve 68 for a purpose later described. A bronze or like metal bearing bushing 70 is mounted upon the brake actuating plunger 26, the bushing receiving the sleeve 68 thereon for movement with the brake plunger during operation of the test adapter. The sleeve 68 includes a machined end surface 72 which engages a like surface 74 on the master cylinder flange when the plunger 26 is extended by the fluid motor 14 prior to initiation of the test procedure. At this time the tip 28 of the plunger engages the piston 32 in recess 30.

As best illustrated in FIG. 3, the sleeve 68 has a flat upper surface 76 having a potentiometer mounting plate 78 secured thereto by a plurality of screws, not shown. The plate 78 contains an axially extending slot 82 which receives a guide button 84 secured to the enlarged portion 24 of the plunger assembly 16. A linear potentiometer assembly 86 is secured to the mounting plate 78 by an angle shaped bracket 88 that is secured to the plate 78 along one edge thereof as illustrated in FIG. 3. The potentiometer assembly 86 includes an actuating plunger 90 which is adjustably received in an axial adjustment mechanism 92 mounted upon a post 94 secured to the enlarged portion 24 of the plunger assembly 16, as shown in FIG. 4. The adjusting assembly 92 is of conventional design and can move axially upon actuating plunger 90 for calibration of the potentiometer prior to use.

The guide button 84 is positioned within the slot 82 of potentiometer plate 78 and slides in the slot as the plunger assembly 16 is actuated by the fluid motor 14. The guide button 84, in this manner, prevents rotation of the plunger assembly 16 during actuation thereof. The sleeve 68 contains a pair of diametrically opposed axial bores, each receiving a guide rod 96, the rods 96 each having a coil spring 98 disposed thereover and having one end in engagement with a surface of the sleeve 68 while the other ends are each received within axial extending bores 100 in the enlarged portion 24 of the plunger assembly 16. The springs bias the potentiometer 86 away from the plunger and result in a lost motion connection between the plunger and the potentiometer assembly during initial movement of the plunger while it is actuated to engage the master cylinder piston and the sleeve is simultaneously moved to engage the machined surface 74 on the master cylinder flange 52.

With reference again to FIG. 3, the support plate 62 contains a rectangular notch 102 slidably receiving a locking key 104 which retains the adapter assembly 10 on master cylinder flange 52 when fitted thereupon. As shown in FIG. 1, the locking key 104 contains a notch 106 which receives a pin 108 actuated by solenoid 110. The support plate 62 contains a vertical counterbore recess 112 which receives the locking pin 108, the solenoid assembly 110 being secured to the plate 62 as shown in FIG. 1. In order to protect the solenoid assembly during use of the adapter 10, a shield 114 in the form of a piece of relatively stiff sheet metal or a bar of steel is provided to protect the solenoid during handling of the adapter. The shield 114 is secured to support plate 62 via a machine screw 116 as shown.

The aforementioned sleeve 68 has a locking key 104 attached for movement therewith whereby the locking key 104 is moved outwardly of the adapter unit to place a portion thereof underneath the axially extending flange 52 of the master cylinder 12. When the key has moved a sufficient distance to align notch 106 with pin 108, the solenoid 110 is energized to extend the pin within the notch and lock the key 104 extended. In this manner, the adapter 10 is fastened upon the master cylinder during the test operation by virtue of the position of the key in conjunction with the engagement of the mounting blocks 46 and 48 with the flange.

Figure 6:
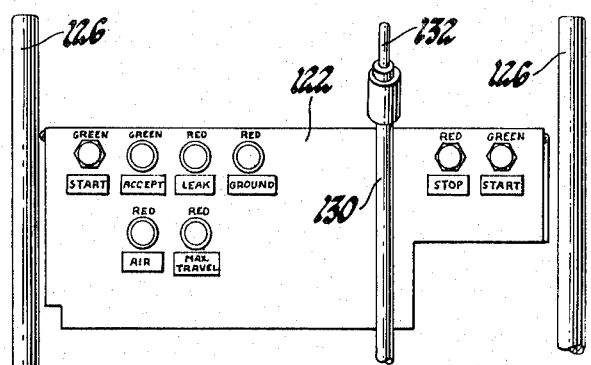
FIG. 6 is an elevational view looking in direction of arrows 6—6 of FIG. 5 illustrating a control panel on the test adapter.

The moving parts of the adapter assembly 10 are enclosed by a bottom cover plate 120 and an upper cover plate 121 which is bent to form angular surfaces 122 and 124 as shown in FIG. 4. The surface 122 supports electrical controls for operation of the test system as illustrated in FIG. 6. The test adapter 10 further includes a rear handle assembly 126 which is secured to end plate 40 by machine screws 128. The test unit further includes an eye bolt bracket 130 semicircular in form having the ends of the bracket secured to outwardly projecting reinforcement members 58 of the side rails 54. The bracket 130 has an eye bolt 132 secured thereto so that the test adapter unit may be supported on a trolley mechanism above the vehicle chassis as they pass on the assembly line. Likewise, the electrical leads, not shown, which supply power to the electrical controls on panel 122 are secured to the trolley mechanism via the supporting eye bolt 132. Additionally, the pressure fluid supplied from an external source to energize fluid motor 14 through port 134 is also supplied through a conduit supported by the eye bolt and the trolley mechanism providing for movement of the adapter unit 10.

Figure 7:
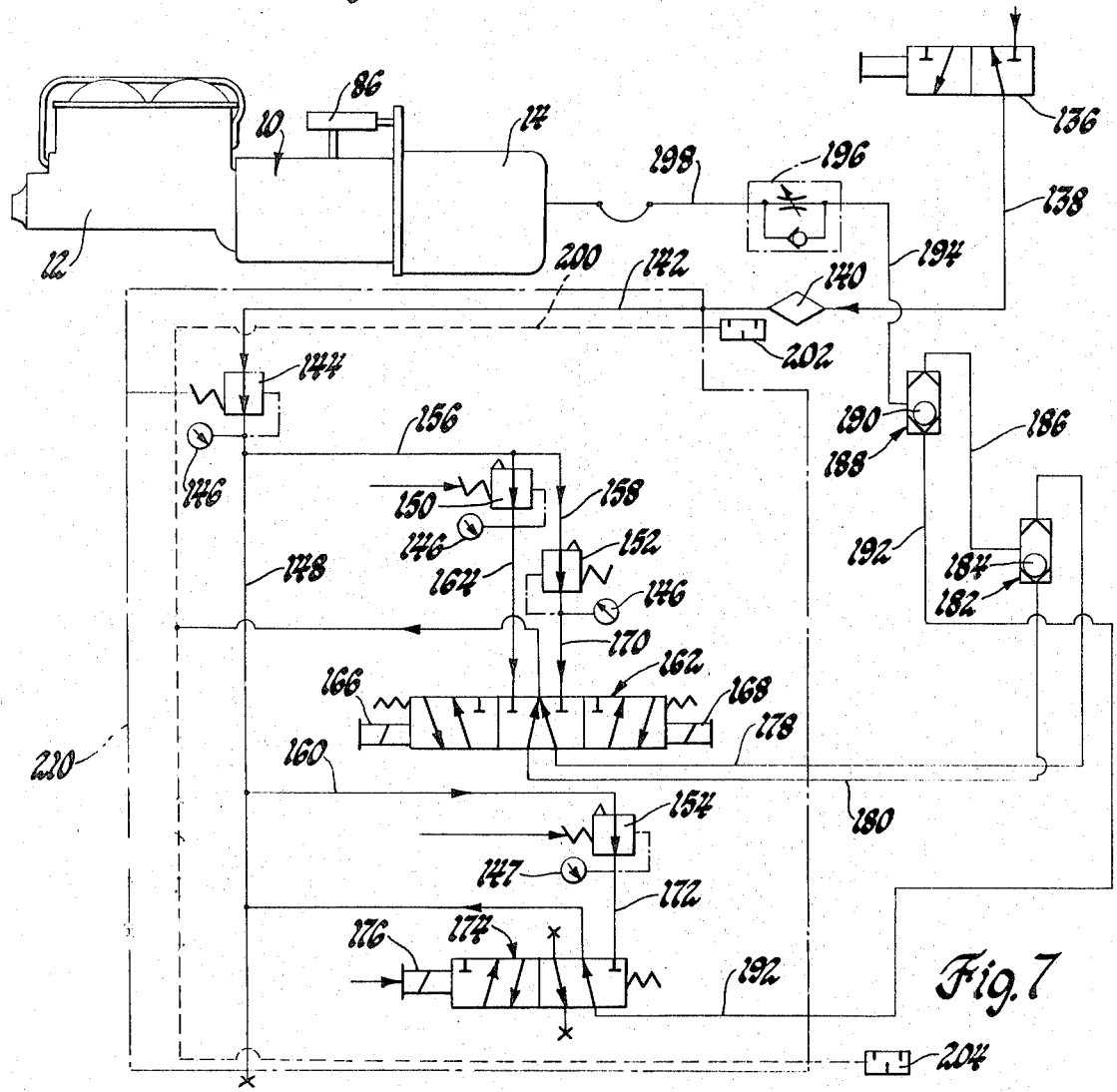
FIG. 7 is a diagrammatic view of one of the test system fluid circuits including the test adapter connected to a vehicle brake master cylinder and containing electrically actuated valves in accordance with the present invention.

Referring now to FIG. 7, a schematic of one fluid plumbing system applicable to a particular brake system which is selectively placed into operation by an operator via the control circuitry as shown. The operator selects a plumbing system designed for the particular brake system as various units come down the assembly line. More specifically, the preferred embodiment of a plumbing system utilizes shop air supplied in the range of 75 to 125 psi to a manual control valve 136, which is an on-off type valve required to be energized prior to supplying pressurized air to the test circuit. The pressurized air exits valve 136 and passes through a conduit 138 to an air filter 140 from which it flows through a conduit 142 to a pressure regulator 144. The pressure regulator 144 includes a gauge 146 for monitoring the pressure discharged from the regulator 144. The pressure regulator 144 is set to 75 psi so that air at a constant pressure is discharged to a conduit 148. The conduit 148 acts as a manifold supplying 75 psi air to three additional pressure regulators 150, 152 and 154 via conduits 156, 158 and 160, respectively. Each of the regulators also are connected to respective gauges 146 for monitoring the flow of air at a particular stage in a test cycle. Pressure regulator 150 is set to supply air at 3 psi to a double acting control valve assembly 162 through a conduit 164, the valve assembly 162 including solenoids 166 and 168. Pressure regulator 152 is set to supply air at 70 psi through conduit 170 to the valve assembly 162. Pressure regulator 154 is set to supply 50 psi air through conduit 172 to a solenoid control valve 174 including a solenoid 176.

The dual solenoid valve assembly 162 connects with conduits 178 and 180 which in turn are connected to respective sides of a ball shuttle valve assembly 182 containing a ball valve 184. The shuttle valve assembly 182 is connected via a conduit 186 to the upper side of a second shuttle valve assembly 188 containing a ball valve 190 while the lower side of the shuttle valve assembly 188 is connected with solenoid valve assembly 174 via a conduit 192. The second shuttle valve assembly 188 has a conduit 194 connected to the mid portion thereof which in turn directs pressurized air to a speed control assembly 196 which regulates the flow of air to fluid motor 14 through conduit 198.

The fluid test circuit illustrated in FIG. 7 can be mounted upon a supporting panel and placed within a control cabinet or it can be assembled in any conventional convenient manner. In any event the test circuit preferably includes an exhaust manifold 200 connected with exhaust mufflers 202 and 204. In the arrangement shown in FIG. 7, the exhaust manifold 200 and the mufflers 202 and 204 are connected on the underneath side of a supporting panel 210. Of course, the purpose of the mufflers 202 and 204 is to quietly exhaust the system as required during the sequential test operation of the fluid motor 14 as it receives various fluid pressures from the control valve assemblies 162 and 174.

ELECTRICAL CONTROL CIRCUITRY

Figure 8:
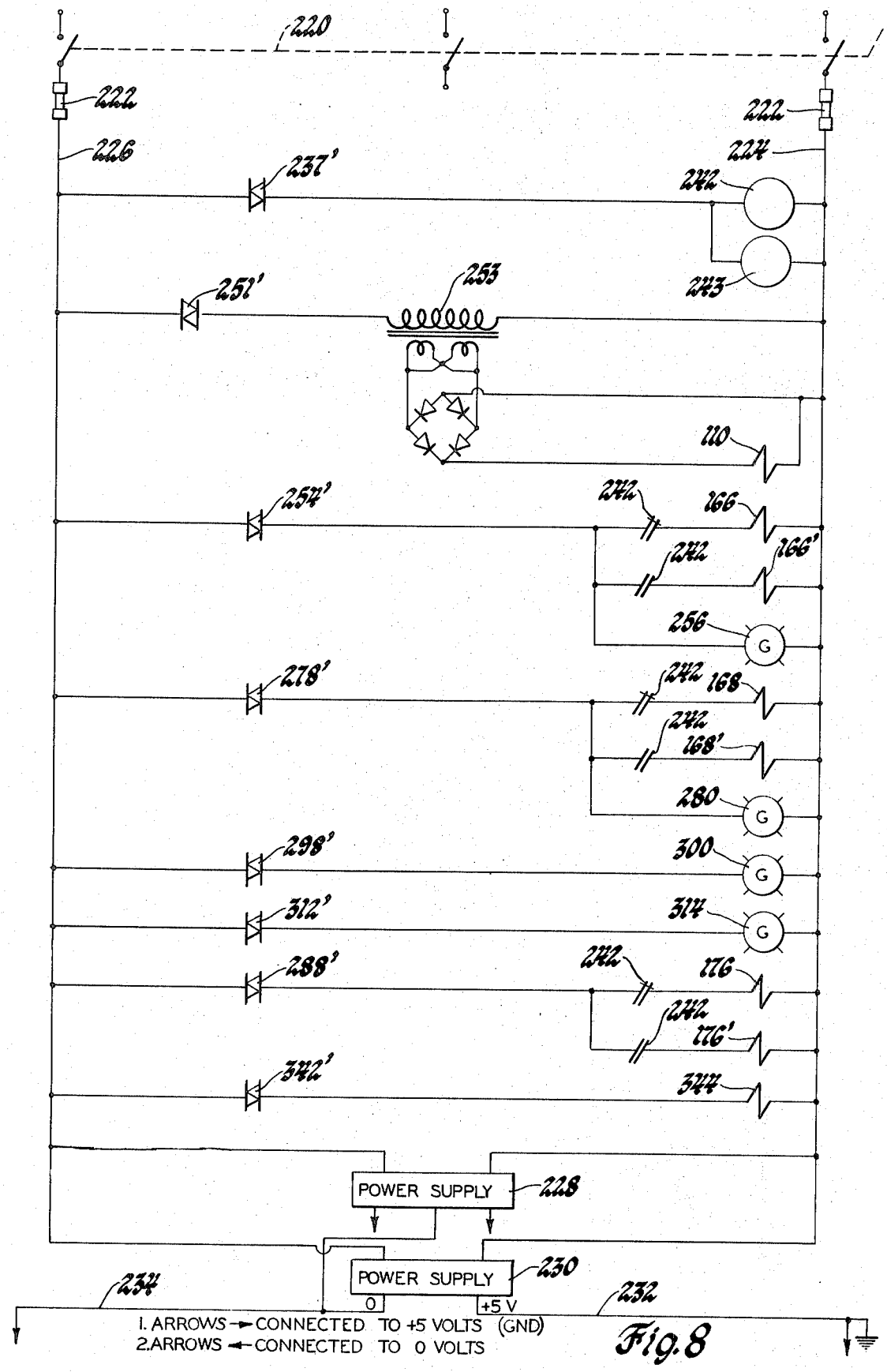
FIG. 8 is a schematic diagram showing a first portion of the solid state electrical control circuitry.

Referring now to FIG. 8, the control circuitry includes a master power on switch 220 having conventional fuses 222 in power supply lines 224 and 226 which are connected through power supply units 228 and 230 to provide a positive 5-volt bias in lead 232 on one side of the control circuitry while a zero voltage bias is provided in lead 234 on the other side of the control circuitry as illustrated. The power supply unit 228 is connected into the control circuitry to provide the power required to drive the various electrical components. The specified switch voltage bias of plus 5 volts in the lead 232 and the zero voltage bias in lead 234 is utilized for purposes of description only. The respective biases in these leads could be adapted or varied for a particular control circuit and therefore is not required to be limited to the specified magnitudes used in this arrangement.

Figure 9:
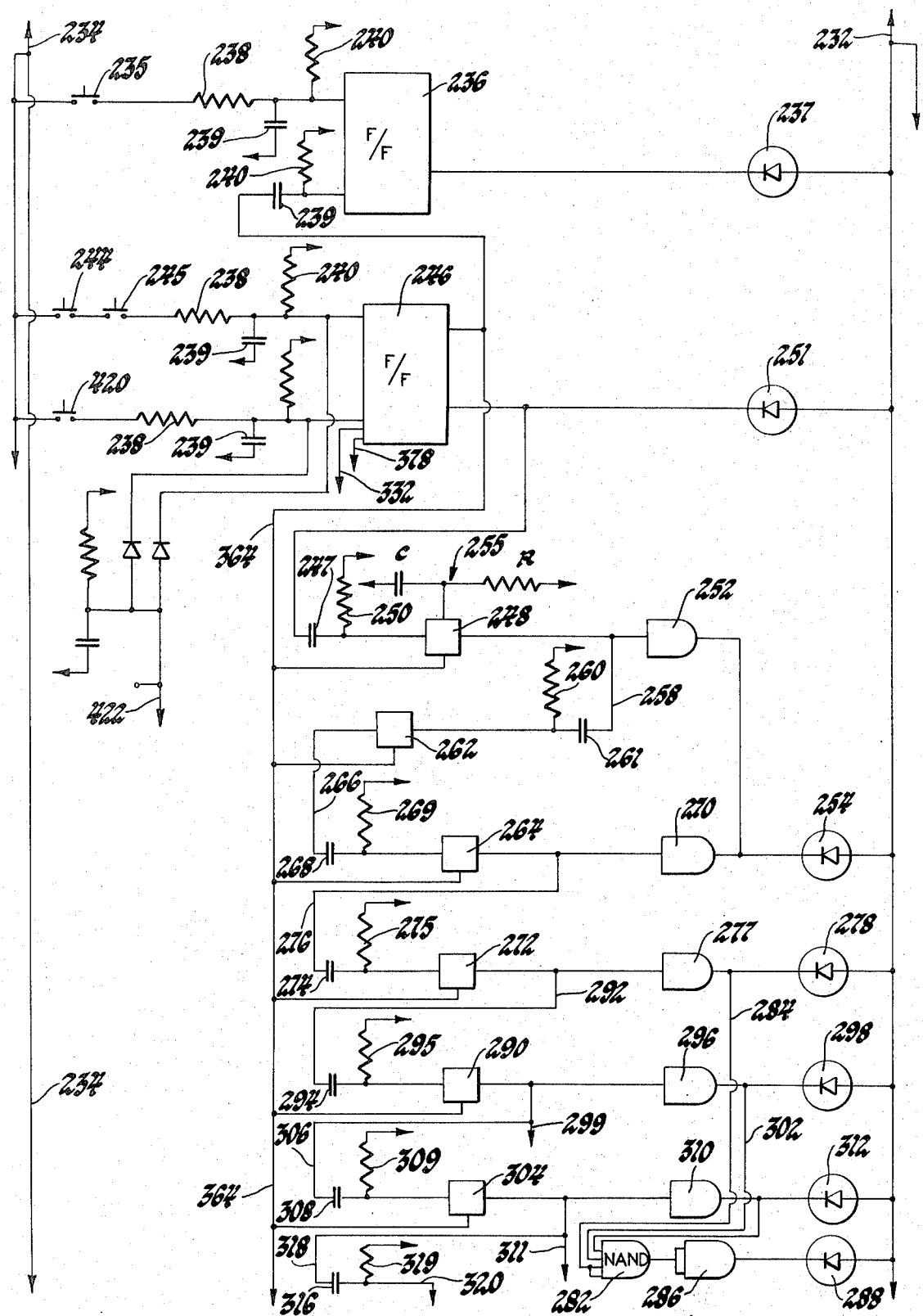
FIG. 9 is a schematic diagram showing an intermediate portion of the solid state electrical control circuitry.

With reference now to FIG. 9, the leads 232 and 234 connect with the portion of the control circuit shown and transmit the switching bias voltage along with the power voltage to the various integrated circuit components. A selector switch 235 regulates a circuit including a flip-flop 236 that turns a solid state relay 237 on and off. A filter network including a resistance 238, a capacitor 239 and a second resistance 240 is connected in the circuit between switch 235 and the flip-flop 236 to insure an accurate signal to the flip-flop. Actuation of the flip-flop 236 and energization of the solid state relay 237 actuates a solid state switch 237' and relays 242 and 243 so that a particular set of master cylinder piston travel values are connected into the circuit along with a particular set of fluid leakage ranges which are applicable to the specific master cylinder under test. The relays 242 and 243 select the power signals to be used in the control circuitry and also select the particular pneumatic system applicable to the brake system under test.

As has been previously mentioned, any number of pneumatic systems can be used with the control circuitry of this invention. For purposes of illustration, only two pneumatic systems are incorporated in the subject disclosure wherein the switch 235 brings in one complete pneumatic circuit similar to that shown in FIG. 7 which is designed for the particular brake system under test. Closure of switches 244 and 245 initiate a conventional test procedure which will be specifically described for purposes of illustration. Closure of these switches, via control circuitry to be subsequently described, brings in operation of the pneumatic circuit disclosed in FIG. 7. It is obvious that the switch 235 could be a multiple position switch wherein any number of pneumatic circuits could be placed into operation so that the circuit could be varied to suit the particular brake system as the vehicle chassis progress along an assembly line set up to handle numerous types of vehicles.

Closure of switches 244 and 245 activates a solid state switch 251' through solid state relay 251. The energization of solid state switch 251' activates a transformer network 253 converting the 110 voltage supply to 24 volts as illustrated in FIG. 8. The output of the transformer network 253 is connected to line 224 and also is effective to energize solenoid 110. The solenoid 110 extends locking pin 108 into notch 106 of locking key 104 as shown in FIG. 1 thereby retaining the test adapter 10 on the master cylinder 12. The control circuit includes switches 244 and 245 which when closed turn on a main flip-flop 246 that sends a voltage signal through capacitor 257 starting a timer 248 for a purpose later described. A resistance 250 is placed in a circuit ahead of the timer 248 so that the timer is not operative until it receives the proper signal through capacitor 247. The timer is started by a signal having a predetermined polarity and the output of the timer goes to an opposite polarity for a time period determined by an RC network 255. The RC network is conventional and is therefore not shown with the remaining timer assemblies in the circuit. The output of the timer 248 is inverted by inverter 252 and is applied to a solid state relay 254. Energization of solid state relay 254 closes its contacts 254' and energizes solenoid 166 of valve assembly 162. If system selector switch 235 has been closed, then solenoid 166' of another pneumatic system is energized. Light 256 is energized informing the operator that this portion of the test is in operation. The energization of solenoid 166 moves the valve assembly 162 to the right connecting regulator 150 with conduit 180 supplying air at 13 psi through the valve 182 and conduit 186 and in turn through shuttle valve 188 to the fluid motor 14 whereby the brake system is pressurized to 300 psi for a period of 2 to 3 seconds. This application of pressure to the system flexes it and makes it more stable for the subsequent test sequence.

Timer 248 times out and drops its output thereby deenergizing solid state relay 254 and consequently deenergizes the solenoid 166 of valve 162 and signal light 256. A signal of proper polarity is transmitted via lead 258 through capacitor 261 to timer 262 which is actuated for a period of time determined by its associated RC network in the same manner as 255 with timer 248 to provide sufficient time for the master cylinder to fully return to a retracted position. This permits the addition of a small amount of brake fluid to the system should it be required. The timer 262 then times out and sends a signal or proper polarity to trigger timer 264 to an alternate state through a lead 266 and capacitor 268. Resistance 269 is placed in the circuit to properly bias the input signal to timer 264. The time period that timer 264 remains in its alternate state of polarity is likewise determined by an RC network and upon expiration of a specified time spontaneously converts the signal back to its original polarity and places the timer in a stable state. While timer 264 is in an alternate state of polarity, the output of the timer 264 is inverted by inverter 270 again energizing solid state relay 254. The solid state relay 254 closes its circuit through contacts 254' and again energizes solenoid 166 of the dual valve assembly 162. Likewise, the signal light 256 is at this time energized.

When the output of timer 264 drops it denergizes solid state relay 254 and consequently solenoid 166 and light 256. At this time, the timer 264 also sends a signal of proper polarity to trigger a timer 272 and activates it through a coupling capacitor 274 via a lead 276. Resistance 275 is placed in the circuit to properly bias the input signal to the timer 272. As is the case with the preceding timers, the output of this timer is of reversed polarity for a time period determined by an RC network associated with the timer 272. The output of timer 272 is inverted by an inverter 277 and is applied to a solid state relay 278 energizing solenoid 168 of the dual solenoid valve assembly 162. The valve assembly moves to connect conduit 170 with conduit 178 so that pressure regulator 152 is placed in communication with the shuttle valves 182 and 188 and 70 psi air is supplied to the fluid motor 14. The 70 psi air is effective to move the fluid motor and consequently the master cylinder piston 32 to pressurize the vehicle brake system to 2,000 psi. This is a maximum or burst pressure test to determine whether the system can withstand such pressure. The 2,000 psi pressure is applied to the system for a period of 5 seconds determined by timer 272. Energization of the solid state relay 278 energizes the solenoid 168 and a signal light 280 informing the operator that the test has progressed to this phase of the test sequence. The output of inverter 277 is also applied to a NAND gate 282 via a lead 284. The signal passes through gate 282 to inverter 186 where the signal is inverted and applied to a solid state relay 288. Energization of solid state relay 288 closes its contacts 288' and energizes solenoid 176 of valve assembly 174. The valve 174 is actuated to connect conduit 172 with conduit 192 whereby air at 56 psi is supplied through the conduit 192 to the lower side of ball valve 190 and shuttle valve assembly 188. However, due to the application of 70 psi air to conduit 186 to the upper side of the ball 190, 70 psi air is continually supplied to fluid motor 14 maintaining the pressure in the brake system at 2,000 psi.

When timer 272 times out is deenergizes solid state relay 278 and opens its contacts 278' deenergizing the 2,000 psi solenoid 168 and simultaneously its indicator light 280. The timing out of timer 272 results in a signal of proper polarity to trigger the next sequentially actuated timer 290 to an alternate state for a time period determined by an RC network whereupon the timer is then spontaneously placed back in a stable state. The timer 290 receives its activating signal through a capacitor 294. Resistance 295 is likewise placed ahead of timer 290 properly biasing the signal to the timer as has been previously described. The output from timer 290 is inverted by inverter 296 to energize a solid state relay 298 whose contacts 298' energize a stabilize pilot light 300. The output of timer 290 is also transmitted through a lead 302 to the NAND gate 282 and to the inverter 286 energizing solid state relay 288 whose contacts 288' energize solenoid 176 of valve assembly 174. The dropping out of timer 272 and the energization of timer 290 is sufficiently rapid that the energization of solenoid 176 remains constant through the transition and the valve assembly 174 does not see the change and remains energized through this period of operation in the circuitry. At this time the 2,000 psi pressure is exhausted out of the brake system as will be later described and the 70 psi air in the fluid motor actuating plumbing is likewise exhausted while 56 psi air is allowed to pass through the shuttle valve assembly 188 by moving ball valve 190 upwardly thereby maintaining sufficient air pressure against fluid motor 14 to retain 1,600 psi test pressure in the brake system. The timer 290 remains energized for a period of 15 seconds to insure sufficient stabilization of the vehicle brake system prior to initiating a test cycle. During this time a signal from timer 290 is transmitted through a lead 299 for a purpose later discussed. The timer 290 times out and deenergizes the stabilize pilot light 300 and at the same time applies a signal of proper polarity to trigger a timer 304 through a lead 306 and a capacitor 308. Resistance 309 is placed in the circuit to properly bias the input signal to the timer 304. The output of timer 304 remains in a proper polarity for a time determined by an RC network and is inverted by an inverter 310, the output of which is applied to a solid state relay 312. The output of timer 304 is also connected to a lead 311 as will be later discussed. The contacts 312' of solid state relay 312 energize a test pilot light 314 indicating the test cycle has been initiated. The output of inverter 310 is also applied to the NAND gate 282, the inverter 286 and solid state relay 288 thereby maintaining contacts 288' closed and holding solenoid 176 energized during the test period. The test timer 304 is set for a period of 10 seconds so that the 1,600 psi pressure is retained in the vehicle brake system during this 10 second test period. The test timer 304 then times out and deenergizes the test pilot light 314 and the output of inverter 310 reverses polarity. At this time the inputs to the NAND gate 282 are of one polarity and the output goes to an opposite polarity, it is then inverted by inverter 286 and no current flows in the solid state relay 288 thereby deenergizing the 1,600 psi solenoid 176 by opening contacts 288'. The output of timer 304 spontaneously goes back to a stable state and as it does so it reverses polarity and sends a signal to a capacitor 316 through a lead 318. The signal through the capacitor 316 is biased by resistance 319.

Figure 10:
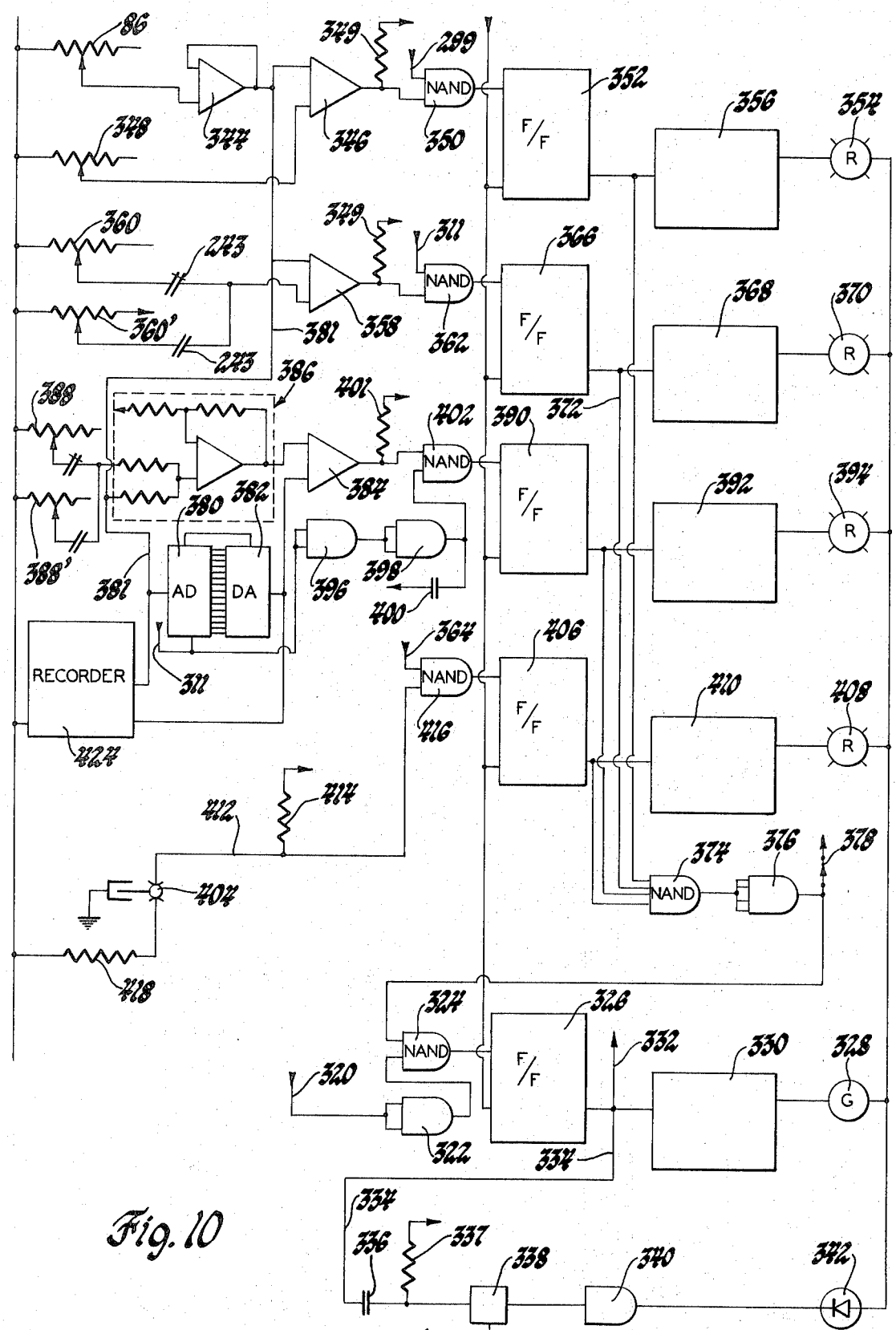
FIG. 10 also is a schematic diagram showing a remaining portion of the solid state electrical control circuitry.

The pulse through capacitor 316 is an end of cycle signal which is transmitted through a lead 320, an inverter 322 and is applied to a NAND gate 324, as shown in FIG. 10. If no faults have occurred during the test, the signal from the NAND gate 324 will turn on a flip-flop circuit 326 whose output energizes an accept pilot light 328 through a light driver unit 330. The light driver unit 330 includes an integrated circuit of conventional design and is included in the circuit to provide a signal sufficient to energize the light 328 upon actuation of the flip-flop 326. The output signal from the flip-flop circuit 326 is also fed to lead 332 to turn off the main flip-flop 246 upon completion of the test. The turning on of flip-flop 326 results in its output signal being also fed in a lead 334 to a capacitor 336 and a resistance 337 which supplies a signal of proper polarity to a timer 338 which is triggered to an alternate state of polarity for a time period determined by its RC network. The output from the timer 338 is supplied to an inverter 340 energizing a solid state relay 342 which through its contacts 342' energizes a solenoid 344 stamp marking acceptance of the brake system upon a record on the assembly line.

FAULT CIRCUITRY

The acceptance or rejection of a particular vehicle brake system is dependent upon the amount of movement of the piston within the master cylinder assembly. The test circuitry of this invention precisely measures any movement of the master cylinder piston to provide reliable results. Movement of the master cylinder piston is measured by the linear potentiometer 86 that is mounted on sleeve 68 which moves with the plunger 26. The sleeve 68 and plunger 26 initially move as a unit and respectively engage machined face 74 of master cylinder flange 52 and master cylinder piston 32. This initial engagement establishes a reference value in the test circuitry so that further movement of the plunger 26 while remaining in engagement with the master cylinder is precisely measured. By establishing a reference value initially, further movement of the master cylinder piston is precisely detected and measured because the potentiometer 86 sends a voltage signal in proportion to the movement.

With reference now to FIG. 10, a schematic diagram illustrating voltage measuring circuits of this invention are shown. The linear potentiometer 86 is connected with a voltage follower unit 344 including a conventional integrated circuit to prevent excessive loading on the linear potentiometer 86. The output of the voltage follower unit 344 is directly related to the output of linear potentiometer 86 which in turn, of course, sends a signal in relation to the movement of the master cylinder piston 32. The output of voltage follower 344 is applied to a comparator 346 which likewise receives a reference voltage set on a minimum travel potentiometer 348 and if the signal from the voltage follower 344 does not exceed the reference voltage, the comparator passes an output voltage of proper polarity to coincide with that of timer 290 which is supplied by lead 299 to a NAND gate 350 causing the output of the gate 350 to reverse and turn on flip-flop 352. A resistance 349 is connected to the output of comparator 346 properly biasing it before being received by gate 350. The output of flip-flop 352 energizes piston movement minimum travel fault pilot light 354 through a conventional light driver unit 356. If the master cylinder piston 32 does not move a predetermined minimum distance, the timer 290 opens gate 350 energizing the light 354 and turns off main flip-flop 246 through lead 378. It is apparent that the reference signal from the minimum travel potentiometer 348 can be varied to suit any particular application, so that the comparator is responsive to the output of the linear potentiometer 86 and is operative in conjunction with the output of timer 290 to activate the NAND gate 350 and consequently energize flip-flop 352 in relation to a particular test under consideration.

An excessive amount of air in the system results in excessive movement of the master cylinder piston so as to energize a maximum travel fault light 370. The output of voltage follower 344 is also applied to a second comparator 358. Maximum reject potentiometers 360 or 360' are set to supply a predetermined reference voltage to the comparator 358 which is in turn connected to a NAND gate 362. The output of timer 340 enables the NAND gate 362 via a lead to turn on flip-flop circuit 366 if the position voltage exceeds the reference voltage at comparator 358 during the timing cycle of timer 304. The output signal from flip-flop 366 energizes light driver 368 which in turn energizes maximum fault pilot light 370. The output of flip-flop 366 is also applied through a lead 372 to a NAND gate 374 and to an inverter 376 which passes a fault signal through a lead 378 back to the main flip-flop 246. This provides an indication that a fault has occurred activating the main flip-flop circuit 246 and stopping the test cycle. The maximum reject potentiometers 360 or 360' are set to determine the maxium permissible travel of the master cylinder piston 32 during application of 1,600 psi test pressure within the brake system. The potentiometer 360' is operative when system selector switch 235 has been closed. In other words, the maximum fault readout is operable to indicate excessive travel of the master cylinder piston during application of the test pressure.

During the period while the timer 304 is operative to retain the brake system pressurized to 1,600 movement of the master cylinder piston is precisely measured by potentiometer 86 to indicate whether or not the leakage, if any, is within an acceptable range. A high degree of accuracy is required during this portion of the test because leakage of a single drop of hydraulic fluid results in a very small increment of movement of the master cylinder piston. In fact, leakage of one drop only creates 0.0025 inch movement of the piston. In this phase of the test the position of the piston is determined by the output of voltage follower 344 which is applied to the input of an A to D converter 380 through lead 381. At the beginning of the leak test, a signal is sent to the converter to start conversion. The analog voltage is converted to a digital number and remembered in the A to D converter 380. This establishes the position of the master cylinder piston 32 at the initiation of the test. This number is immediately input to a D to A converter 382 and is converted back to a voltage of the same magnitude. The combination of the A to D and D to A conversion is a very accurate sample and hold system; in other words, it remembers precisely the position of the master cylinder piston 32 on initiation of the leak test. The output of the D to A converter 383 is a reference voltage and is fed to the comparator 384.

The position voltage through the linear potentiometer 86 and the voltage follower 344 is likewise fed to a voltage adder network 386 whose output is the sum of the position voltage and a voltage signal from a leak reject potentiometer 388 or 388' which is calibrated in drops of leakage and is preset establishing an acceptable range of leakage for the particular system. The voltage from the leak reject potentiometer 388 is opposite in polarity to that from the voltage follower 344 and if the modified voltage, as combined by the adder, exceeds the reference voltage from the D to A converter 382, a fault flip-flop 390 is operated which in turn actuates a light driver 392 energizing a leak fault pilot light 394. Inverters 396 and 398, and a capacitor 400 are provided to give the A to D and D to A converters time to stabilize at a constant signal before enabling a NAND gate 402 which may trigger flip-flop circuit 390 to indicate a leak fault.

A clip adapter assembly 404 attaches to the safety switch on the brake system master cylinder and is required to be connected prior to initiation of the test cycle. If the brake safety switch grounds indicating a faulty brake system, a flip-flop 406 is actuated energizing a ground fault pilot light 408 through a light driver unit 410. The grounded signal from the clip adapter 404 passes through lead 412 where it is biased by resistance 414 and is applied to a NAND gate 416 which in turn opens triggering the flip-flop circuit 406. A resistance 418 holds the voltage through the clip 404 to a relatively low value.

As is shown in FIGS. 9 and 10, lead 378 receives fault signals, if any, from the four flip-flop circuits 352, 366, 390 and 406 so that a fault of any type turns off the main flip-flop circuit 246. Closure of start switches 244 and 245 as well as closure of a manual stop switch 420 resets all of the flip-flop circuits in the test circuitry via a signal in lead 422. In this manner, the circuit is prepared for a subsequent test. A recorder 424 can be connected in the test circuitry to record the signals indicating any movement of the master cylinder piston.

While we have shown and described a particular embodiment of our invention it will, of course, be understood that various modifications and alternative constructions thereof may be made without departing from the true spirit and scope of our invention and that we intend by the appended claims to cover all such modifications and alternative constructions as fall within the true spirit and scope of our invention.

We claim:

1. A vehicle brake leakage testing system comprising a hydraulic circuit including a master cylinder assembly containing a piston for pressurizing the closed hydraulic circuit comprising in combination: an adaptor fitting upon said master cylinder; a plunger slidably mounted in said adaptor; means actuating said plunger engaging said master cylinder piston and pressurizing the fluid in said hydraulic brake circuit to a predetermined pressure in relation to the amount of movement of said plunger; an electrical control circuit automatically actuating said plunger actuating means to subject the brake system to a predetermined pressure test sequence; means sensing movement of said master cylinder piston during said test sequence; and electrical means in said control circuit comparing movement of said piston with predetermined acceptable values and indicating whether the brake system meets a predetermined standard during each phase of the test sequence.

2. A leakage test apparatus for a vehicle brake system of the type employing a master cylinder containing a piston movable to pressurize a closed hydraulic fluid system for applying the brakes comprising in combination: an adaptor fitting upon said master cylinder; a plunger slidably mounted in said adaptor and being positioned in axial alignment with said master cylinder piston; selectively energized means extending said plunger into engagement with and moving said piston to various positions during a predetermined test sequence subjecting the brake system to specific pressurized conditions; electrical control circuitry automatically sequentially energizing said plunger extending means; electrical means measuring the distance of travel of said master cylinder piston; electrical means comparing the movement of said piston with predetermined accaptable values at each stage of the test sequence; and electrical means automatically indicating whether the brake system is acceptable as a result of the comparison with predetermined standards.

3. A leakage test apparatus for a vehicle brake fluid system of the type employing a master cylinder assembly including a piston pressurizing the fluid system for applying the brakes comprising in combination: a flange on said master cylinder assembly; a test adaptor containing a recess receiving said flange for mounting said adaptor on said master cylinder; a fluid motor attached to said adaptor; a sleeve slidably mounted in said adapter; a plunger slidably mounted in said sleeve and being actuated by said fluid motor into engagement with said master cylinder piston; a linear potentiometer mounted on said sleeve and having a rod secured to said plunger for movement therewith; means providing a lost motion connection between said potentiometer rod and said sleeve until the sleeve and plunger respectively engage said master cylinder flange and piston; a pressurized fluid system selectively supplying fluid at specific pressures to said fluid motor moving said plunger against said master cylinder piston pressurizing the vehicle brake system to specific pressures during a predetermined test sequence; electrically actuated control valves in said pressurized fluid system; electrical control circuitry automatically sequencing said valves during the test sequence; variable means in said control circuitry establishing acceptable reference signals for comparison with test signals supplied in said control circuit from said linear potentiometer; said linear potentiometer sending a signal to an analog to digital and digital to analog converter in the control circuit at the beginning of a leakage test establishing a reference signal; a comparator in said control circuitry receiving said reference signal and a test signal from said linear potentiometer during the test thereby accurately sensing and comparing any master cylinder piston movement; means in said control circuitry automatically terminating the test sequence upon receipt of any unacceptable electrical signals indicating a faulty brake system; and means in said control circuit automatically resetting the circuit upon the initiation of a subsequent test sequence.

4. A leakage test apparatus as described in claim 3 wherein plural pressurized fluid systems are capable of being selectively connected to said fluid motor and said control circuitry includes switch means for selecting a particular fluid system applicable to a specific vehicle brake system whereby plural types of vehicles can be tested on a particular assembly line.

5. A leakage test apparatus as described in claim 3 wherein said control circuitry is composed of solid state components and a recorder is connected in the circuit automatically recording the test signals.

* * * * *

PO-1050
(5/69)

UNITED STATES PATENT OFFICE
CERTIFICATE OF CORRECTION

Patent No. 3,858,436  Dated January 7, 1975

Inventor(s) Lawrence A. Hines, Jr. and Walter M. Gaudette, Jr.

It is certified that error appears in the above-identified patent and that said Letters Patent are hereby corrected as shown below:

In the ABSTRACT, line 6, "degress" should read -- degrees --; line 14, "opposiion" should read -- opposition --.

Column 4, line 50, "until" should read -- unit --. Column 5, line 23, "3 psi" should read -- 13 psi --. Column 6, line 59, "257" should read -- 247 --. Column 8, line 4, "186" should read -- 286 --; line 16, "is" should read -- it --. Column 10, line 55, after "1,600" insert -- psi, --. Column 11, line 12, "383" should read -- 382 --.

Signed and sealed this 12th day of March 1975.

(SEAL)
Attest:

RUTH C. MASON
Attesting Officer

C. MARSHALL DANN
Commissioner of Patents
and Trademarks